(12) United States Patent
Zhao et al.

(10) Patent No.: US 12,187,838 B2
(45) Date of Patent: Jan. 7, 2025

(54) PREPARATION METHOD OF SELF-THIXOTROPIC POLYURETHANE CURING AGENT, SELF-THIXOTROPIC POLYURETHANE CURING AGENT AND APPLICATION THEREOF

(71) Applicant: SHENZHEN FEIYANG PROTECH CORP., LTD, Guangdong (CN)

(72) Inventors: Poli Zhao, Guangdong (CN); Shankai Luo, Guangdong (CN); Jun Xue, Guangdong (CN); Xiaoyong Qiu, Guangdong (CN); Wenfeng Bai, Guangdong (CN); Yingqi Tang, Guangdong (CN)

(73) Assignee: SHENZHEN FEIYANG PROTECH CORP., LTD, Guangdong (CN)

( * ) Notice: Subject to any disclaimer, the term of this patent is extended or adjusted under 35 U.S.C. 154(b) by 0 days.

(21) Appl. No.: 18/399,115

(22) Filed: Dec. 28, 2023

(65) Prior Publication Data
US 2024/0376249 A1    Nov. 14, 2024

(30) Foreign Application Priority Data
May 10, 2023   (CN) .......................... 202310523244.7

(51) Int. Cl.
| | | |
|---|---|---|
| *C08G 18/42* | (2006.01) | |
| *C08G 18/48* | (2006.01) | |
| *C08G 18/73* | (2006.01) | |
| *C08G 18/75* | (2006.01) | |
| *C08G 18/76* | (2006.01) | |

(52) U.S. Cl.
CPC ..... *C08G 18/4277* (2013.01); *C08G 18/4238* (2013.01); *C08G 18/4825* (2013.01); *C08G 18/4854* (2013.01); *C08G 18/73* (2013.01); *C08G 18/755* (2013.01); *C08G 18/758* (2013.01); *C08G 18/7671* (2013.01)

(58) Field of Classification Search
CPC ........... C08G 18/4277; C08G 18/4238; C08G 18/4825; C08G 18/4854; C08G 18/73; C08G 18/755; C08G 18/758; C08G 18/7671
See application file for complete search history.

(56) References Cited

U.S. PATENT DOCUMENTS

2021/0340416 A1*  11/2021  Sun ........................ C08K 3/013

FOREIGN PATENT DOCUMENTS

| JP | 2014059489 A | * | 4/2014 | ............. | G03G 15/08 |
| JP | 2016204541 A | * | 12/2016 | | |

* cited by examiner

*Primary Examiner* — Rabon A Sergent
(74) *Attorney, Agent, or Firm* — Cooper Legal Group, LLC

(57) ABSTRACT

A preparation method for a self-thixotropic polyurethane curing agent includes the following steps: mixing an isocyanate and a crystalline polyester diol and/or polyether diol, reacting at a temperature between 70° C.-110° C., after a reaction, cooling to room temperature and standing still for more than 12 h to obtain the self-thixotropic polyurethane curing agent.

3 Claims, 2 Drawing Sheets

PREPARATION METHOD OF SELF-THIXOTROPIC POLYURETHANE CURING AGENT, SELF-THIXOTROPIC POLYURETHANE CURING AGENT AND APPLICATION THEREOF

TECHNICAL FIELD

The present application relates to the technical field of isocyanate curing agent, and in particular, relates to a preparation method for a self-thixotropic polyurethane curing agent, self-thixotropic polyurethane curing agent and an application thereof.

BACKGROUND ART

Common coatings and adhesives are always added with a certain amount of thixotropic agent, which is mainly for improving the situation of uneven coating of adhesive film and inability to fill cracks caused by flowing of the coatings and adhesives under gravitational action during the processes of facade construction and crack repair. The principle is that a certain weak interaction is formed in the continuous phases by using the thixotropic agent, and the shear-thinning occurs under external force and the shear-thickening occurs after removing the external forces, such that the material would not flow under the gravitational action while the construction is not affected.

The common thixotropic agents used in coatings and adhesives are fumed silicon dioxide, organic bentonite, polyamide wax, polyurea, ethylene wax, hydrogenated castor oil, metallic soaps and hydroxyethyl cellulose, etc., which form certain weak interactions in resin continuous phases to form thixotropy through adsorption, hydrogen bond, ionic bond, thermodynamic finite mutual solubility and other principles.

When the above thixotropic agents are used in polyurethane system, a gelatinization phenomenon may appear in the system during preparation or storage process due to high reactivity of isocyanate. For example, the fumed silicon dioxide has large specific surface area and strong interfacial tension, its powder may absorb a certain amount of water. If the powder does not undergo a dehydration treatment by high temperature, the water will react and cross-link with isocyanate components during storage, resulting in a gelatinization phenomenon. Polyamide wax powder is a material having strong polar, which commonly needs to be activated by adding a certain amount of small molecule alcohol solvents, however, active hydrogen of alcohol is easy to react with isocyanate, and most of polyamide wax powder is easy to be dissolved in the polyurethane products due to similarity between amide bonds and amino ester bonds, such that the products have poor thixotropy, even no thixotropy.

Therefore, developing a self-thixotropic curing agent suitable for polyurethane system is necessary.

SUMMARY

In order to solve a problem that the current thixotropic agent is easy to cause gelatinization phenomenon of system due to high reactivity of isocyanate when being used in polyurethane system, the present application provides a preparation method for a self-thixotropic polyurethane curing agent, a self-thixotropic polyurethane curing agent and an application thereof.

In a first aspect, the present application provides a preparation method for a self-thixotropic polyurethane curing agent, adopting the following technical solution:

a preparation method for a self-thixotropic polyurethane curing agent includes the following steps:

mixing an isocyanate and a crystalline polyester diol and/or polyether diol, reacting at a temperature between 70° C.-110° C., after a reaction, cooling to room temperature and standing still for more than 12 h to obtain the self-thixotropic polyurethane curing agent. Room temperature refers to 25° C.

In the above technical solution, the polyester polyol and/or polyether polyol having high crystallinity are dissolved at high temperature and reacted with isocyanate, after cooling to room temperature, the polyester polyol chain segments, having high crystallinity, have limited compatibility in isocyanates or crystallize grains and gel particles. In isocyanate continuous phase, thin grains and gel particles will generate weak interactions such as adsorption and bonding, such that the isocyanate produces thixotropic reaction. The prepared self-thixotropic polyurethane curing agent is a white paste, which has good self-thixotropy and is suitable for the polyurethane system.

In an embodiment, a weight proportion of the polyester diol and/or polyether diol in the self-thixotropic polyurethane curing agent is from 1 wt % to 82 wt %.

In the above technical solution, when the weight proportion of the polyester diol and/or polyether diol in the self-thixotropic polyurethane curing agent is less than 1 wt %, the number of grains in products is too small, and the obtained products have poor thixotropy. When the weight proportion of the polyester diol and/or polyether diol in the self-thixotropic polyurethane curing agent is greater than 82 wt %, the NCO value of product is too low. Although the thixotropy of the product is good, too low NCO value does not have practical application value.

In an embodiment, a weight proportion of the polyester diol and/or polyether diol in the self-thixotropic polyurethane curing agent is from 1 wt % to 40 wt %.

In an embodiment, the polyester diol is one or more selected from the group consisting of poly (butylene succinate), poly (hexamethylene succinate), poly (ethylene adipate), poly (butylene adipate), poly (1, 6-hexamethylene adipate) and polycaprolactone; and polyether diol is poly tetrahydrofuran ether and/or polyglycol ether.

In an embodiment, a molecular weight of the polyester diol and/or the polyether diol is 1000-100000.

After test, when the molecular weight of the polyester diol and/or polyether diol is lower than 1000, they have weak crystallinity. When the molecular weight of the polyester diol and/or polyether diol is greater than 100000, the system is too viscous and the product is difficult to be prepared, and the prepared product is difficult to be dissolved in the polyurethane system.

In an embodiment, the molecular weight of the polyester diol and/or polyether diol is 10000-100000.

After test, when the molecular weight of the polyester diol and/or polyether diol is 10000-100000, a curing agent with good thixotropy can be prepared by adding a small amount of the polyester diol and/or polyether diol, the reason is that a small amount of the polyester diol and/or polyether diol cannot obviously decrease the NCO value of the product.

In an embodiment, the isocyanate is one or more selected from the group consisting of HDI (Hexamethylene Diisocyanate), IPDI (isophorone diisocyanate), HMDI (Dicyclohexylmethane diisocyanate), TDI (toluene diisocyanate), MDI (methylene diphenyl diisocyanate) and the derivatives thereof.

In an embodiment, the isocyanate is a derivative of isocyanate.

Polyurethane monomer has strong solubility to polyester diol and polyether diol, so a large amount of polyester diol and polyether diol need to be added to produce thixotropy in polyurethane. However, the derivatives of isocyanates such as adducts and trimers of isocyanates will decrease the solubility to polyester diol and polyether diol, the self-thixotropic curing agent can be obtained by only adding a small amount of polyester diol and polyether diol.

In an embodiment, the isocyanate is one or more selected from the group consisting of HDI dimer or trimer, IPDI dimer or trimer, HMDI dimer or trimer, TDI dimer or trimer, MDI dimer or trimer, an adduct of HDI and polyol, an adduct of IPDI and polyol, an adduct of HMDI and polyol, an adduct of TDI and polyol, and an adduct of MDI and polyol.

In a second aspect, the present application provides a self-thixotropic polyurethane curing agent, which is prepared by the above preparation method for the self-thixotropic polyurethane curing agent in the above technical solution.

The prepared self-thixotropic polyurethane curing agent is a white paste, which has good self-thixotropy, is difficult to generate gelatinization phenomenon, and is suitable for the polyurethane system.

In a third aspect, the present application provides an application of the self-thixotropic polyurethane curing agent in above technical solution in fields of coatings, adhesives, and sealing agents.

When the self-thixotropic polyurethane curing agent is applied in coatings, the coatings have good thixotropy. The coating is not easy to flow under gravitational action during coating and is easy to be coated.

In summary, the present application has at least one of the following beneficial technical effects:

1. the polyester polyol and/or polyether polyol having high crystallinity are dissolved at high temperature and reacted with isocyanate, after cooling to room temperature, the polyester polyol chain segments, having high crystallinity, have limited compatibility in isocyanates or crystallize grains and gel particles. In isocyanate continuous phases, thin grains and gel particles will generate weak interactions such as adsorption and bonding, such that the isocyanate produces thixotropic reaction; and 2. the prepared self-thixotropic polyurethane curing agent is a white paste, which has good self-thixotropy, is difficult to generate gelatinization phenomenon, and is suitable for the polyurethane system.

DETAILED DESCRIPTION

Figure 1:
FIG. 1 is a picture of a self-thixotropic polyurethane curing agent sample prepared in the example of the present application.

In order to conveniently understand the technical solution of the present application, the present application will be further described in detail below in combination with tables and the examples, which does not limit the protective scope of the present application.

EXAMPLES

Example 1

336 g (2 mol) of HDI and 800 g (0.8 mol) of polycaprolactone diol with a molecular weight of 1000 were added into a four-necked flask and reacted at 85° C., after the reaction was completed, the resultant was cooled to room temperature and stood still for 12 h to obtain milk white paste finished product.

Example 2

336 g (2 mol) of HDI and 500 g (0.25 mol) of polycaprolactone diol with a molecular weight of 2000 were added into a four-necked flask and reacted at 85° C., after the reaction was completed, the resultant was cooled to room temperature and stood still for 12 h to obtain milk white paste finished product.

Example 3

336 g (2 mol) of HDI and 200 g (0.05 mol) of polycaprolactone diol with a molecular weight of 4000 were added into a four-necked flask and reacted at 85° C., after the reaction was completed, the resultant was cooled to room temperature and stood still for 12 h to obtain milk white paste finished product.

Example 4

336 g (2 mol) of HDI and 50 g (0.005 mol) of polycaprolactone diol with a molecular weight of 10000 were added into a four-necked flask and reacted at 85° C., after the reaction was completed, the resultant was cooled to room temperature and stood still for 12 h to obtain milk white paste finished product.

Example 5

336 g (2 mol) of HDI and 45 g (0.0009 mol) of polycaprolactone diol with a molecular weight of 50000 were added into a four-necked flask and reacted at 85° C., after the reaction was completed, the resultant was cooled to room temperature and stood still for 12 h to obtain milk white paste finished product.

Example 6

336 g (2 mol) of HDI and 40 g (0.0004 mol) of polycaprolactone diol with a molecular weight of 100000 were added into a four-necked flask and reacted at 85° C., after the reaction was completed, the resultant was cooled to room temperature and stood still for 12 h to obtain milk white paste finished product.

Example 7

336 g (2 mol) of HDI and 800 g (0.8 mol) of poly (butylene succinate) diol with a molecular weight of 1000 were added into a four-necked flask and reacted at 85° C., after the reaction was completed, the resultant was cooled to room temperature and stood still for 12 h to obtain milk white paste finished product.

Example 8

336 g (2 mol) of HDI and 50 g (0.005 mol) of poly (butylene succinate) diol with a molecular weight of 10000 were added into a four-necked flask and reacted at 85° C., after the reaction was completed, the resultant was cooled to room temperature and stood still for 12 h to obtain milk white paste finished product.

Example 9

336 g (2 mol) of HDI and 40 g (0.0004 mol) of poly (butylene succinate) diol with a molecular weight of 100000 were added into a four-necked flask and reacted at 85° C., after the reaction was completed, the resultant was cooled to room temperature and stood still for 12 h to obtain milk white paste finished product.

Example 10

336 g (2 mol) of HDI and 800 g (0.8 mol) of poly (ethylene adipate) diol with a molecular weight of 1000 were added into a four-necked flask and reacted at 85° C., after the reaction was completed, the resultant was cooled to room temperature and stood still for 12 h to obtain milk white paste finished product.

Example 11

336 g (2 mol) of HDI and 50 g (0.005 mol) of poly (ethylene adipate) diol with a molecular weight of 10000 were added into a four-necked flask and reacted at 85° C., after the reaction was completed, the resultant was cooled to room temperature and stood still for 12 h to obtain milk white paste finished product.

Example 12

336 g (2 mol) of HDI and 40 g (0.0004 mol) of poly (ethylene adipate) diol with a molecular weight of 100000 were added into a four-necked flask and reacted at 85° C., after the reaction was completed, the resultant was cooled to room temperature and stood still for 12 h to obtain milk white paste finished product.

Example 13

336 g (2 mol) of HDI and 800 g (0.8 mol) of poly (butylene adipate) diol with a molecular weight of 1000 were added into a four-necked flask and reacted at 85° C., after the reaction was completed, the resultant was cooled to room temperature and stood still for 12 h to obtain milk white paste finished product.

Example 14

336 g (2 mol) of HDI and 50 g (0.005 mol) of poly (butylene adipate) diol with a molecular weight of 10000 were added into a four-necked flask and reacted at 85° C., after the reaction was completed, the resultant was cooled to room temperature and stood still for 12 h to obtain milk white paste finished product.

Example 15

336 g (2 mol) of HDI and 40 g (0.0004 mol) of poly (butylene adipate) diol with a molecular weight of 100000 were added into a four-necked flask and reacted at 85° C., after the reaction was completed, the resultant was cooled to room temperature and stood still for 12 h to obtain milk white paste finished product.

Example 16

336 g (2 mol) of HDI and 800 g (0.8 mol) of poly (1, 6-hexamethylene adipate) diol with a molecular weight of 1000 were added into a four-necked flask and reacted at 85° C., after the reaction was completed, the resultant was cooled to room temperature and stood still for 12 h to obtain milk white paste finished product.

Example 17

336 g (2 mol) of HDI and 50 g (0.005 mol) of poly (1, 6-hexamethylene adipate) diol with a molecular weight of 10000 were added into a four-necked flask and reacted at 85° C., after the reaction was completed, the resultant was cooled to room temperature and stood still for 12 h to obtain milk white paste finished product.

Example 18

336 g (2 mol) of HDI and 40 g (0.0004 mol) of poly (1, 6-hexamethylene adipate) diol with a molecular weight of 100000 were added into a four-necked flask and reacted at 85° C., after the reaction was completed, the resultant was cooled to room temperature and stood still for 12 h to obtain milk white paste finished product.

Example 19

336 g (2 mol) of HDI and 1000 g (1 mol) of poly tetrahydrofuran ether diol with a molecular weight of 1000 were added into a four-necked flask and reacted at 85° C., after the reaction was completed, the resultant was cooled to room temperature and stood still for 12 h to obtain milk white paste finished product.

Example 20

336 g (2 mol) of HDI and 250 g (0.035 mol) of poly tetrahydrofuran ether diol with a molecular weight of 10000 were added into a four-necked flask and reacted at 85° C., after the reaction was completed, the resultant was cooled to room temperature and stood still for 12 h to obtain milk white paste finished product.

Example 21

336 g (2 mol) of HDI and 150 g (0.0004 mol) of poly tetrahydrofuran ether diol with a molecular weight of 100000 were added into a four-necked flask and reacted at 85° C., after the reaction was completed, the resultant was cooled to room temperature and stood still for 12 h to obtain milk white paste finished product.

Example 22

336 g (2 mol) of HDI and 900 g (0.8 mol) of polyethylene glycol ether diol with a molecular weight of 1000 were added into a four-necked flask and reacted at 85° C., after the reaction was completed, the resultant was cooled to room temperature and stood still for 12 h to obtain milk white paste finished product.

Example 23

336 g (2 mol) of HDI and 150 g (0.005 mol) of polyethylene glycol ether diol with a molecular weight of 10000 were added into a four-necked flask and reacted at 85° C., after the reaction was completed, the resultant was cooled to room temperature and stood still for 12 h to obtain milk white paste finished product.

Example 24

336 g (2 mol) of HDI and 100 g (0.0004 mol) of polyethylene glycol ether diol with a molecular weight of 100000 were added into a four-necked flask and reacted at 85° C., after the reaction was completed, the resultant was cooled to room temperature and stood still for 12 h to obtain milk white paste finished product.

Example 25

444 g (2 mol) of IPDI and 2000 g (1 mol) of polycaprolactone diol with a molecular weight of 2000 were added into a four-necked flask and reacted at 85° C., after the reaction was completed, the resultant was cooled to room temperature and stood still for 12 h to obtain milk white paste finished product.

Example 26

444 g (2 mol) of IPDI and 100 g (0.01 mol) of polycaprolactone diol with a molecular weight of 10000 were added into a four-necked flask and reacted at 85° C., after the reaction was completed, the resultant was cooled to room temperature and stood still for 12 h to obtain milk white paste finished product.

Example 27

444 g (2 mol) of IPDI and 90 g (0.0009 mol) of polycaprolactone diol with a molecular weight of 100000 were added into a four-necked flask and reacted at 85° C., after the reaction was completed, the resultant was cooled to room temperature and stood still for 12 h to obtain milk white paste finished product.

Example 28

524 g (2 mol) of HMDI and 2000 g (1 mol) of polycaprolactone diol with a molecular weight of 2000 were added into a four-necked flask and reacted at 85° C., after the reaction was completed, the resultant was cooled to room temperature and stood still for 12 h to obtain milk white paste finished product.

Example 29

524 g (2 mol) of HMDI and 80 g (0.008 mol) of polycaprolactone diol with a molecular weight of 10000 were added into a four-necked flask and reacted at 85° C., after the reaction was completed, the resultant was cooled to room temperature and stood still for 12 h to obtain milk white paste finished product.

Example 30

524 g (2 mol) of HMDI and 70 g (0.0007 mol) of polycaprolactone diol with a molecular weight of 100000 were added into a four-necked flask and reacted at 85° C., after the reaction was completed, the resultant was cooled to room temperature and stood still for 12 h to obtain milk white paste finished product.

Example 31

500 g (2 mol) of MDI and 500 g (0.5 mol) of polycaprolactone diol with a molecular weight of 1000 were added into a four-necked flask and reacted at 85° C., after the reaction was completed, the resultant was cooled to room temperature and stood still for 12 h to obtain milk white paste finished product.

Example 32

500 g (2 mol) of MDI and 70 g (0.004 mol) of polycaprolactone diol with a molecular weight of 10000 were added into a four-necked flask and reacted at 85° C., after the reaction was completed, the resultant was cooled to room temperature and stood still for 12 h to obtain milk white paste finished product.

Example 33

500 g (2 mol) of MDI and 60 g (0.0003 mol) of polycaprolactone diol with a molecular weight of 100000 were added into a four-necked flask and reacted at 85° C., after the reaction was completed, the resultant was cooled to room temperature and stood still for 12 h to obtain milk white paste finished product.

Example 34

500 g of HDI trimer and 15 g (0.0015 mol) of polycaprolactone diol with a molecular weight of 10000 were added into a four-necked flask and reacted at 85° C., after the reaction was completed, the resultant was cooled to room temperature and stood still for 12 h to obtain milk white paste finished product.

Example 35

500 g of HDI trimer and 10 g (0.0001 mol) of polycaprolactone diol with a molecular weight of 100000 were added into a four-necked flask and reacted at 85° C., after the reaction was completed, the resultant was cooled to room temperature and stood still for 12 h to obtain milk white paste finished product.

Example 36

500 g of HDI biuret and 10 g (0.0001 mol) of polycaprolactone diol with a molecular weight of 100000 were added into a four-necked flask and reacted at 85° C., after the reaction was completed, the resultant was cooled to room temperature and stood still for 12 h to obtain milk white paste finished product.

Example 37

500 g of L-75 curing agent (commercially available from Wanhua Chemical Group Co., Ltd.) with 75% solid content and 20 g (0.0002 mol) of polycaprolactone diol with a molecular weight of 100000 were added into a four-necked flask and reacted at 85° C., after the reaction was completed, the resultant was cooled to room temperature and stood still for 12 h to obtain milk white paste finished product.

Example 38

336 g (2 mol) of HDI, 1000 g (1 mol) of poly (2-methyl-1,3-propandiol) diadipate diol with a molecular weight of 1000, 60 g (0.0006 mol) of polycaprolactone diol with a molecular weight of 100000 were reacted at 85° C., after the reaction was completed, the resultant was cooled to room temperature to obtain milk white paste finished product.

Example 39

336 g (2 mol) of HDI, 1000 g (1 mol) of poly (3-methyl-1,5-pentanediol) diadipate diol with a molecular weight of 1000, 60 g (0.0006 mol) of polycaprolactone diol with a molecular weight of 100000 were reacted at 85° C., after the reaction was completed, the resultant was cooled to room temperature to obtain milk white paste finished product.

Example 40

336 g (2 mol) of HDI, 1000 g (1 mol) of polypropylene glycol ether with a molecular weight of 1000, 40 g (0.0003 mol) of polycaprolactone diol with a molecular weight of 100000 were reacted at 85° C., after the reaction was completed, the resultant was cooled to room temperature to obtain milk white paste finished product.

COMPARATIVE EXAMPLE

Comparative Example 1

336 g (2 mol) of HDI and 1000 g (1 mol) of poly (2-methyl-1,3-propandiol) diadipate diol with a molecular weight of 1000 were added into a four-necked flask and reacted at 85° C., after the reaction was completed, the resultant was cooled to room temperature and stood still for 12 h to obtain colorless transparent liquid.

Comparative Example 2

336 g (2 mol) of HDI and 2000 g (1 mol) of poly (2-methyl-1,3-propandiol) diadipate diol with a molecular weight of 2000 were added into a four-necked flask and reacted at 85° C., after the reaction was completed, the resultant was cooled to room temperature and stood still for 12 h to obtain colorless transparent liquid.

Comparative Example 3

336 g (2 mol) of HDI and 2000 g (0.5 mol) of poly (2-methyl-1,3-propandiol) diadipate diol with a molecular weight of 4000 were added into a four-necked flask and reacted at 85° C., after the reaction was completed, the resultant was cooled to room temperature and stood still for 12 h to obtain colorless transparent liquid.

Comparative Example 4

336 g (2 mol) of HDI and 200 g (0.02 mol) of poly (2-methyl-1,3-propandiol) diadipate diol with a molecular weight of 10000 were added into a four-necked flask and reacted at 85° C., after the reaction was completed, the resultant was cooled to room temperature and stood still for 12 h to obtain colorless transparent liquid.

Comparative Example 5

336 g (2 mol) of HDI and 200 g (0.02 mol) of poly (3-methyl-1,5-pentanediol) diadipate diol with a molecular weight of 10000 were added into a four-necked flask and reacted at 85° C., after the reaction was completed, the resultant was cooled to room temperature and stood still for 12 h to obtain colorless transparent liquid.

Comparative Example 6

336 g (2 mol) of HDI and 1000 g (0.1 mol) of polypropylene glycol ether diol with a molecular weight of 10000 were added into a four-necked flask and reacted at 85° C., after the reaction was completed, the resultant was cooled to room temperature and stood still for 12 h to obtain colorless transparent liquid.

TABLE 1 the component proportions and the state of the obtained products in Examples 1-40 and Comparative examples 1-6

| | Polyester diol and/or polyether diol | | | | Products | |
|---|---|---|---|---|---|---|
| | Components | Molecular weight | Weight porpuration | Isocyanates | State | NCO value |
| Example 1 | Polycaprolactone diol | 1000 | 70.40 wt % | HDI | Milk white paste | 8.87% |
| Example 2 | Polycaprolactone diol | 2000 | 59.80 wt % | HDI | Milk white paste | 17.58% |
| Example 3 | Polycaprolactone diol | 4000 | 37.20 wt % | HDI | Milk white paste | 30.56% |
| Example 4 | Polycaprolactone diol | 10000 | 12.90 wt % | HDI | Milk white paste | 43.41% |
| Example 5 | Polycaprolactone diol | 50000 | 11.80 wt % | HDI | Milk white paste | 44.07% |

TABLE 1-continued the component proportions and the state of the obtained products in Examples 1-40 and Comparative examples 1-6

| | Polyester diol and/or polyether diol | | | | Products | |
|---|---|---|---|---|---|---|
| | Components | Molecular weight | Weight porporation | Isocyanates | State | NCO value |
| Example 6 | Polycaprolactone diol | 100000 | 10.60 wt % | HDI | Milk white paste | 44.67% |
| Example 7 | Poly (butylene succinate) diol | 1000 | 70.40 wt % | HDI | Milk white paste | 8.87% |
| Example 8 | Poly (butylene succinate) diol | 10000 | 12.90 wt % | HDI | Milk white paste | 43.41% |
| Example 9 | Poly (butylene succinate) diol | 100000 | 10.60 wt % | HDI | Milk white paste | 44.67% |
| Example 10 | Poly (ethylene adipate) diol | 1000 | 70.40 wt % | HDI | Milk white paste | 8.87% |
| Example 11 | Poly (ethylene adipate) diol | 10000 | 12.90 wt % | HDI | Milk white paste | 43.41% |
| Example 12 | Poly (ethylene adipate) diol | 100000 | 10.60 wt % | HDI | Milk white paste | 44.67% |
| Example 13 | Poly (butylene adipate) diol | 1000 | 70.40 wt % | HDI | Milk white paste | 8.87% |
| Example 14 | Poly (butylene adipate) diol | 10000 | 12.90 wt % | HDI | Milk white paste | 43.41% |
| Example 15 | Poly (butylene adipate) diol | 100000 | 10.60 wt % | HDI | Milk white paste | 44.67% |
| Example 16 | Poly (1,6-hexamethylene adipate) diol | 1000 | 70.40 wt % | HDI | Milk white paste | 8.87% |
| Example 17 | Poly (1,6-hexamethylene adipate) diol | 10000 | 12.90 wt % | HDI | Milk white paste | 43.41% |
| Example 18 | Poly (1,6-hexamethylene adipate) diol | 100000 | 10.60 wt % | HDI | Milk white paste | 44.67% |
| Example 19 | Poly tetrahydrofuran ether diol | 1000 | 74.80 wt % | HDI | Milk white paste | 6.29% |
| Example 20 | Poly tetrahydrofuran ether diol | 10000 | 42.70 wt % | HDI | Milk white paste | 28.31% |
| Example 21 | Poly tetrahydrofuran ether diol | 100000 | 30.80 wt % | HDI | Milk white paste | 34.54% |
| Example 22 | Polyethylene glycol ether diol | 1000 | 72.80 wt % | HDI | Milk white paste | 7.48% |
| Example 23 | Polyethylene glycol ether diol | 10000 | 30.80 wt % | HDI | Milk white paste | 34.31% |
| Example 24 | Polyethylene glycol ether diol | 100000 | 22.90 wt % | HDI | Milk white paste | 38.51% |
| Example 25 | Polycaprolactone diol | 2000 | 81.80 wt % | IPDI | Milk white paste | 3.44% |
| Example 26 | Polycaprolactone diol | 10000 | 18.40 wt % | IPDI | Milk white paste | 30.73% |
| Example 27 | Polycaprolactone diol | 100000 | 16.80 wt % | IPDI | Milk white paste | 31.45% |
| Example 28 | Polycaprolactone diol | 2000 | 79.20 wt % | HMDI | Milk white paste | 3.33% |
| Example 29 | Polycaprolactone diol | 10000 | 13.20 wt % | HMDI | Milk white paste | 27.70% |

TABLE 1-continued the component proportions and the state of the obtained
products in Examples 1-40 and Comparative examples 1-6

| | Polyester diol and/or polyether diol | | | | Products | |
|---|---|---|---|---|---|---|
| | Components | Molecular weight | Weight porporation | Isocyanates | State | NCO value |
| Example 30 | Polycaprolactone diol | 100000 | 11.80 wt % | HMDI | Milk white paste | 28.27% |
| Example 31 | Polycaprolactone diol | 1000 | 50.00 wt % | MDI | Milk white paste | 12.60% |
| Example 32 | Polycaprolactone diol | 10000 | 12.30 wt % | MDI | Milk white paste | 29.37% |
| Example 33 | Polycaprolactone diol | 100000 | 10.70 wt % | MDI | Milk white paste | 29.99% |
| Example 34 | Polycaprolactone diol | 10000 | 2.90 wt % | HDI trimer | Milk white paste | 22.31% |
| Example 35 | Polycaprolactone diol | 100000 | 2.00 wt % | HDI trimer | Milk white paste | 22.55% |
| Example 36 | Polycaprolactone diol | 100000 | 2.00 wt % | HDI biuret | Milk white paste | 22.55% |
| Example 37 | Polycaprolactone diol | 100000 | 3.80 wt % | L75 | Milk white paste | 12.78% |
| Example 38 | Poly (2-methyl-1,3-propandiol) diadipate diol/Polycaprolactone diol | 1000/100000 | 4.30 wt % | HDI | Milk white paste | 6.01% |
| Example 39 | Poly (2-methyl-1,3-propandiol) diadipate diol/Polycaprolactone diol | 1000/10000 | 4.30 wt % | HDI | Milk white paste | 6.01% |
| Example 40 | Polypropylene glycol ether/Polycaprolactone diol | 1000/100000 | 2.90 wt % | HDI | Milk white paste | 6.10% |
| Comparative example 1 | Poly (2-methyl-1,3-propandiol) diadipate diol | 1000 | 0 | HDI | Colorless transparent liquid | 6.29% |
| Comparative example 2 | Poly (2-methyl-1,3-propandiol) diadipate diol | 2000 | 0 | HDI | Colorless transparent liquid | 3.60% |
| Comparative example 3 | Poly (2-methyl-1,3-propandiol) diadipate diol | 4000 | 0 | HDI | Colorless transparent liquid | 5.39% |
| Comparative example 4 | Poly (2-methyl-1,3-propandiol) diadipate diol | 10000 | 0 | HDI | Colorless transparent liquid | 31.03% |
| Comparative example 5 | Poly (3-methyl-1,5-pentanediol) diadipate diol | 10000 | 0 | HDI | Colorless transparent liquid | 31.03% |
| Comparative example 6 | Polypropylene glycol ether diol | 10000 | 0 | HDI | Colorless transparent liquid | 11.95% |

Figure 2:
FIG. 2 is a picture of another self-thixotropic polyurethane curing agent sample prepared in another example of the present application.

As can be seen from Examples 1-40 and the data of table 1 that, the crystalline diols such as poly (butylene succinate), poly (ethylene adipate), poly (butylene adipate), poly (1,6-hexamethylene adipate), polycaprolactone, poly tetrahydrofuran ether and polyethylene glycol ether are dissolved after heating up and reacted with isocyanate, and cooled to room temperature, then crystals are precipitated from the curing agent products to obtain white paste with strong thixotropy, as shown in FIG. 1-2, which has good thixotropy in different isocyanate monomer such as HDI, IPDI, HMDI, MDI, HDI trimer, HDI biuret and solvent based TDI adduct L75. As can be seen that, using crystalline diols to prepare self-thixotropic polyurethane curing agents is universality. The products in FIG. 1-2 are self-thixotropic polyurethane curing agents prepared according to the proportion of Example 30, the products prepared in other examples have almost identical appearance with that of Example 30, which are white paste and not shown here.

As can be seen from Comparative examples 1-6 that, the obtained products prepared by the noncrystalline polyester diol and polyether diol with side chains is colorless transparent liquid and have no thixotropy.

As can be seen from Examples 1-6 and data in table 1 that, the amounts of diols required for preparing the self-thixotropic polyurethane curing agent varies depending on the molecular weight thereof. The polyester diol with relative small molecular weight has poor crystallinity and slow crystallization velocity, so the crystallinity of the curing agent needs to be enhanced by increasing the amount of the polyester diol. The polyester diol with relative large molecular weight has good crystallinity and fast crystallization velocity, so the amount of polyester diol required for preparing the self-thixotropic polyurethane curing agent can be decreased. When the molecular weight of the crystalline diol molecular is greater than 10000, the required amounts thereof have a small difference.

As can be seen from Examples 1-6, 19-24 and data in table 1 that, the amount of polyether diol required is greater than that of polyester diol under the same molecular weight, the reason is that the crystallinity and cohesion of polyether diol are poorer than that of polyester diol, so the amount of polyether diol needs to be increased to enhance the crystallinity of curing agent. The amount of polyether diol required is decreased with the increase of molecular weight.

As can be seen from Examples 1-6, 25-33 and data in table 1 that, the isocyanate monomer has a certain impact on the amount of crystalline polyester diol. MDI monomer with a symmetrical molecular structure and a good crystallinity requires the least amount of polyester diol, HDI monomer with a symmetrical molecular structure requires a small amount of polyester diol, and HMDI monomer containing isomer mixture requires less amount of polyester diol than that of IPDI monomer with an asymmetrical molecular structure.

As can be seen from Examples 38-40, Comparative examples 1-6 and data in table 1 that, noncrystalline diol curing agent can generate thixotropy by adding a small amount of crystalline polyester diol with high molecular weight.

As can be seen from Examples 1-40 and data in table 1 that, the amount of crystalline polyester diol required for the polymer is less than that of isocyanate monomer, the reason is that the isocyanate monomer has small molecular weight and good solubility to crystalline polyester diol/polyether diol, which decreases the crystallinity of polyester diol/polyether diol.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. A preparation method for a self-thixotropic polyurethane curing agent, comprising:
    mixing an isocyanate and at least one of a crystalline polyester diol or a crystalline polyether diol, reacting at a temperature between 70° C.-110° C., and after a reaction, cooling to room temperature and standing still for more than 12 h to obtain the self-thixotropic polyurethane curing agent;
    wherein a weight proportion of the at least one of the crystalline polyester diol or the crystalline polyether diol in the self-thixotropic polyurethane curing agent is from 1 wt % to 40 wt %;
    wherein a molecular weight of the at least one of the crystalline polyester diol or the crystalline polyether diol is 10000-100000.

2. The preparation method for a self-thixotropic polyurethane curing agent according to claim 1, wherein the crystalline polyester diol is one or more selected from the group consisting of poly (butylene succinate), poly (hexamethylene succinate), poly (ethylene adipate), poly (butylene adipate), poly (1, 6-hexamethylene adipate) and polycaprolactone; and the crystalline polyether diol is at least one of poly tetrahydrofuran ether or polyglycol ether.

3. The preparation method for a self-thixotropic polyurethane curing agent according to claim 1, wherein the isocyanate is one or more selected from the group consisting of hexamethylene diisocyanate (HDI), isophorone diisocyanate (IPDI), Dicyclohexylmethane diisocyanate (HMDI), toluene diisocyanate (TDI), methylene diphenyl diisocyanate (MDI), HDI dimer, HDI trimer, IPDI dimer, IPDI trimer, HMDI dimer, HMDI trimer, TDI dimer, TDI trimer, MDI dimer, MDI trimer, an adduct of HDI and polyol, an adduct of IPDI and polyol, an adduct of HMDI and polyol, an adduct of TDI and polyol, and an adduct of MDI and polyol.

* * * * *